United States Patent [19]
Sato et al.

[11] Patent Number: 5,315,442
[45] Date of Patent: May 24, 1994

[54] ELECTRICALLY FOLDABLE REARVIEW MIRRORS

[75] Inventors: Hidenori Sato; Naoto Iwanabe, both of Fujieda, Japan

[73] Assignee: Murakami Kaimeido Co., Ltd., Shizuoka, Japan

[21] Appl. No.: 997,245

[22] Filed: Dec. 28, 1992

[30] Foreign Application Priority Data

Dec. 26, 1991 [JP] Japan .................. 3-112134[U]

[51] Int. Cl.⁵ .......................................... G02B 7/182
[52] U.S. Cl. ................................... 359/877; 359/841; 318/469; 318/286; 73/1 D
[58] Field of Search ............ 359/841, 877; 318/469, 318/286; 73/1 D; 361/23, 54

[56] References Cited

U.S. PATENT DOCUMENTS

| | | | |
|---|---|---|---|
| 4,394,607 | 7/1983 | Lemirande | 318/469 |
| 4,626,083 | 12/1986 | Nakayama et al. | 359/841 |
| 4,786,157 | 11/1988 | Mori et al. | 359/877 |
| 4,798,967 | 1/1989 | Yamana et al. | 359/877 |
| 4,910,445 | 3/1990 | Borrmann | 318/286 |
| 4,981,347 | 1/1991 | Nakayama | 359/841 |
| 4,982,926 | 1/1991 | Mori et al. | 359/877 |
| 5,008,603 | 4/1991 | Nakayama et al. | 359/877 |

*Primary Examiner*—Loha Ben
*Assistant Examiner*—Thomas Robbins
*Attorney, Agent, or Firm*—Michael J. Striker

[57] ABSTRACT

The electrical control system for an electrically powered foldable rearview mirror having a mirror body mounted on a hollow supporting shaft extending from a supporting base so as to be movable between a folded state and an erected state, comprises a reversible motor and reduction gear drive contained in the mirror body; a motor drive circuit connected to the reversible motor to drive the mirror body between the folded state and the errected state; a mechanical stop device to stop rotation of the mirror body when the mirror body reaches the erected state or the folded state including convex and concave portions on the a root portion of the shaft and mirror body respectively; a noncontacting sensor for detecting a halt to motor rotation as a result of a halt of mirror body rotation; and a control circuit for interrruption of the motor drive circuit when the noncontacting sensor detects the halt of the motor rotation.

6 Claims, 5 Drawing Sheets

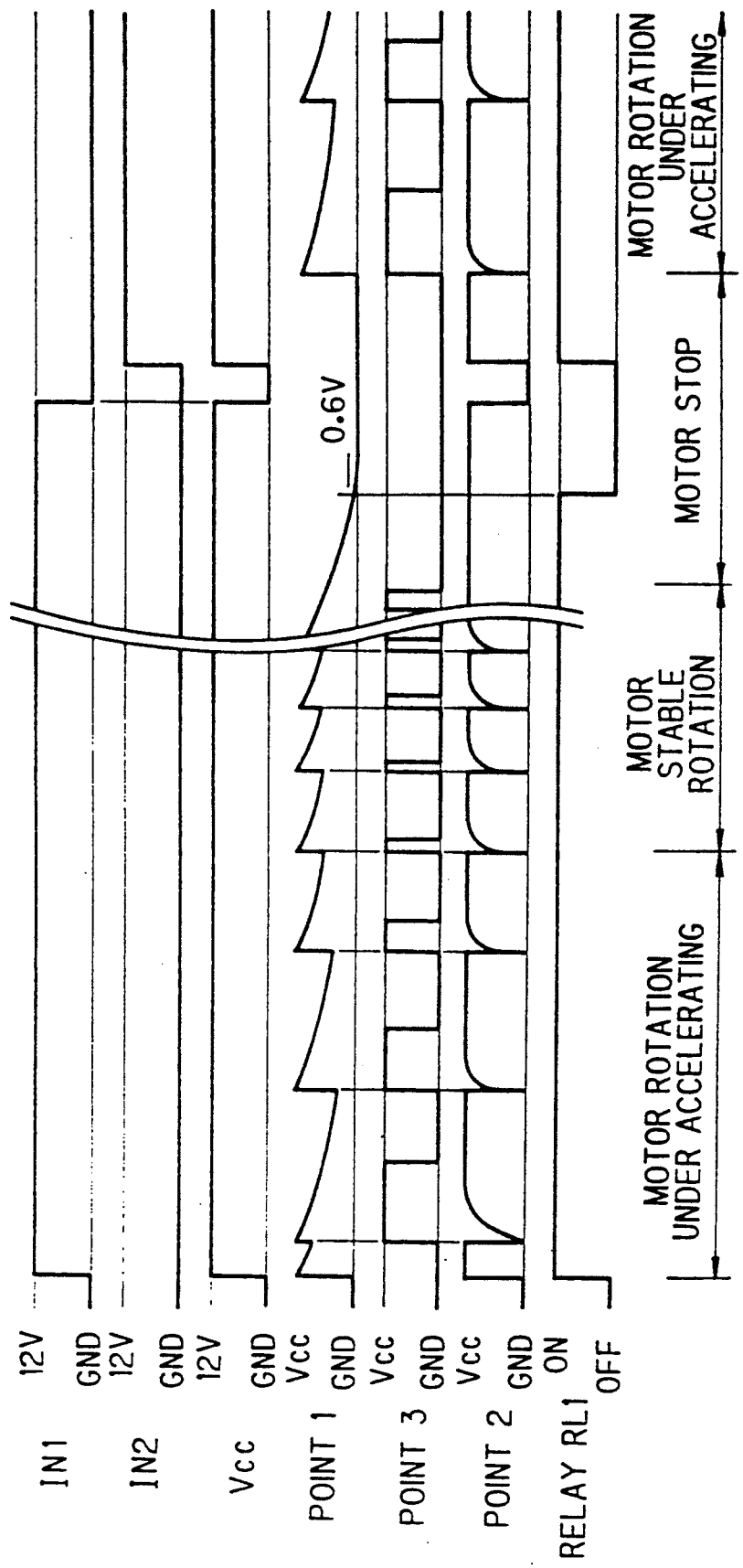

ELECTRICALLY FOLDABLE REARVIEW MIRRORS

BACKGROUND OF THE INVENTION

The present invention relates to electrically powered foldable rearview mirrors of a motor vehicle and, more particularly, to an electrically powered control system for electrically powered foldable rear view mirrors.

Conventional electrically powered foldable rearview mirrors for a motor vehicle are provided on the exterior of the vehicle for the driver so that the driver can see to the rear of the vehicle and are folded by an internal electric motor as needed or are deployed in the erected state during driving. As disclosed by Japanese Published Patent Application No. Sho 63-169341, the electrically powered foldable rearview mirror comprises a shaft mounted on an extension of a base fixed to a door panel or to a quarter window of the vehicle, a spring and a clutch gear respectively received in a frame connected to the shaft and a clutch receiver pressing the spring and thereafter being fixed to the shaft. The clutch gear is adapted to engage with a pinion gear which is rotated by the internal electric motor in a mirror body via a speed reduction mechanism and the mirror body is rotated around the shaft by actuating the electric motor.

In an erected state or a folded state of the electrically powered foldable rearview mirrors, methods of deenergizing the motor control circuit while the rotation of the mirror body is being halted by a rotation step means are described hereinbelow. In one of the methods, means for changing the circuit is provided at the rotating parts between a clutch retainer fixed on the shaft and the mirror body, so that a folding state of the control circuit is changed to an erecting state of the control circuit and vice versa and the motor control circuit is interrupted or opened, when the mirror body rotates and reaches the folded state or the erected state. In another method, a load current of the motor is detected to interrupt the control circuit.

In a conventional control system for electrically powered foldable rearview mirrors as described hereinbefore, in the control system having the means for changing the circuit as described above, it is difficult to adjust the means for changing the circuit to the erected state or the folded state of the mirror body. Furthermore because the means for changing the circuit includes; a slide contact system, there is a problem due to an imperfect contact on the rotating contact surface a foreign material contamination and the like and the circuit composition is complicated. Moreover, in the latter method of detecting the load current of the motor, because of the environmental conditions during mirror rotation, variable friction on the slide rotating surface, foreign contamination or thermal variation, a load fluctuation of the motor is caused thus making the correct stopping of the mirror body based on a motor load fluctuation criteria impossible.

SUMMARY OF THE INVENTION

It is an object of the present invention to provide an improved electrically powered foldable rearview mirror which has none of the above-described disadvantages.

Another object of the present invention is to provide a control system for electrically powered foldable rearview mirrors having a simple circuit composition capable of actuating accurately and the mirror body is correctly stopped at the stopping position of the erected and folded state.

According to the present invention, the electrical control system for an electrically powered foldable rearview mirror having a mirror body movable between a folded state and an erected state comprises a reversible motor contained in the mirror body; motor drive circuit means connected to the reversible motor to drive or move the mirror body between the folded state and the erected state; mechanical stop means to stop rotation of the mirror body when the mirror body reaches the erected state or the folded state; noncontacting sensor means for detecting a halt to motor rotation as a result of a halt of mirror body rotation; and control circuit means for interruption of the motor drive circuit means when the noncontacting sensor means detects the halt of the motor rotation.

In a preferred embodiment of the invention the control circuit means includes power circuit means; switching means for switching the motor drive circuit on and off, the switching means including a switching transistor having a base; sensor circuit means connected to the noncontacting sensor means to generate a plurality of pulses according to a rotation frequency of the motor; sensor pulse processing means including a differentiation circuit having a capacitor and resistor. The differentiation circuit is advantageously connected electrically to the sensor circuit means, the capacitor of the differentiation circuit is charged and discharged by the pulses and is also connected electrically to the base of the switching transistor to turn the switching transistor off and on.

The electrically powered foldable rearview mirror also advantageously comprises a supporting base and a supporting shaft having a root portion connected to the supporting base so that the mirror body is rotatably mounted on the supporting shaft movable between the erected state and the folded state.

In one embodiment of the invention the mechanical stop means is provided in the vicinity of the root portion of the supporting shaft. The mechanical stop means comprises convex and concave portions positioned on the root portion and mirror body respectively and structured to stop the mirror body in the erected state and the folded state, and the motor is structured so as to be unable to generate sufficient torque to overcome the mechanical stop means.

Advantageously in another embodiment the motor has a motor drive shaft and the noncontacting sensor means comprises a reflected light photodetector and light source mounted on a printed circuit board not rotating with the motor drive shaft and a reflecting plate attached nonrotatably to the motor drive shaft and positioned and structured so as to reflect light from the light source to the reflected light photodetector when the reflecting plate passes the reflected light photodetector and light source during rotation of the motor drive shaft.

In an alternative embodiment the motor has a motor drive shaft and the noncontacting sensor means comprises a magnet attached nonrotatably to the motor drive shaft and a magnetic sensitive element not rotating with the motor drive shaft and positioned and structured so as to produce a signal indicative of a motor drive shaft rotation frequency.

BRIEF DESCRIPTION OF THE DRAWINGS

The above described objects and the attendant advantages of this invention will be readily appreciated by reference to the following detailed description when considered in connection with the accompanying drawing.

FIG. 6 is a timing chart for the control circuit means of FIG. 5.

DETAILED DESCRIPTION OF THE PREFERRED EMBODIMENTS

Figure 1:
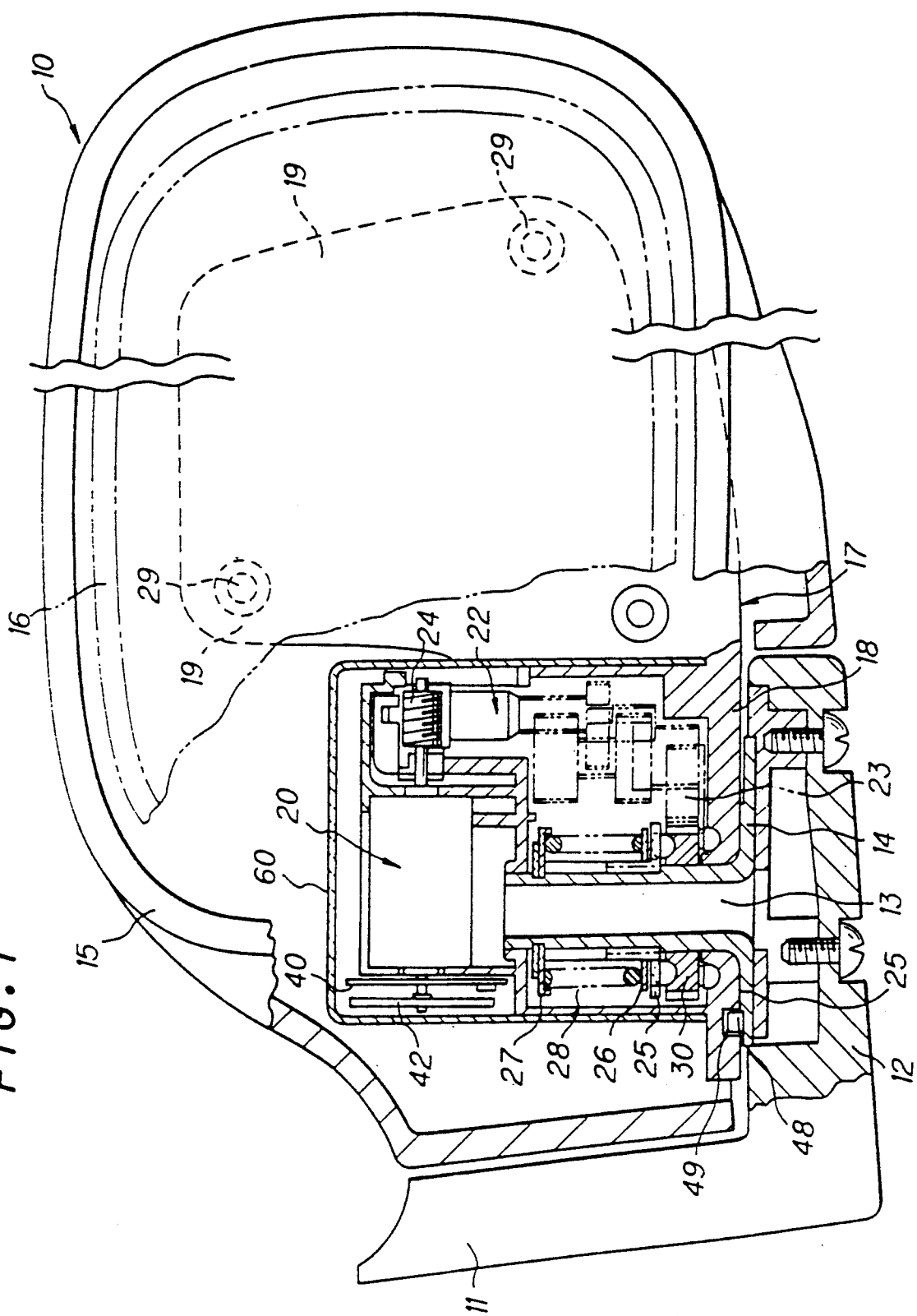
FIG. 1 is a partial cut-away front view of an electrically powered foldable rearview mirror provided with a control system according to the present invention.

Referring first to FIG. 1, the electrically powered foldable rearview mirror 10 includes a mirror body 15 rotatably supported on a hollow supporting shaft 13 which is mounted on the extension 12 of a supporting base 11, an electric drive means (motor) 20 and a reduction gear train 22 contained in a base portion 18 of a frame 17 and a clutch gear 30 provided around the supporting shaft 13 so as to be fixed to the supporting shaft at the time of the mirror being electrically folded and to be free from the supporting shaft at the time of the mirror being rotated. The reduction gear train 22 is connected with a worm 24 mounted on an output shaft 21 of the electric drive means 20 so as to be engaged with the clutch gear 30 in which the end gear 23 of the reduction gear train 22 is mounted. In FIG. 1, a sealing cap 60 covers the whole electric device and a printed circuit board 40 for the motor control circuit.

Figure 2:
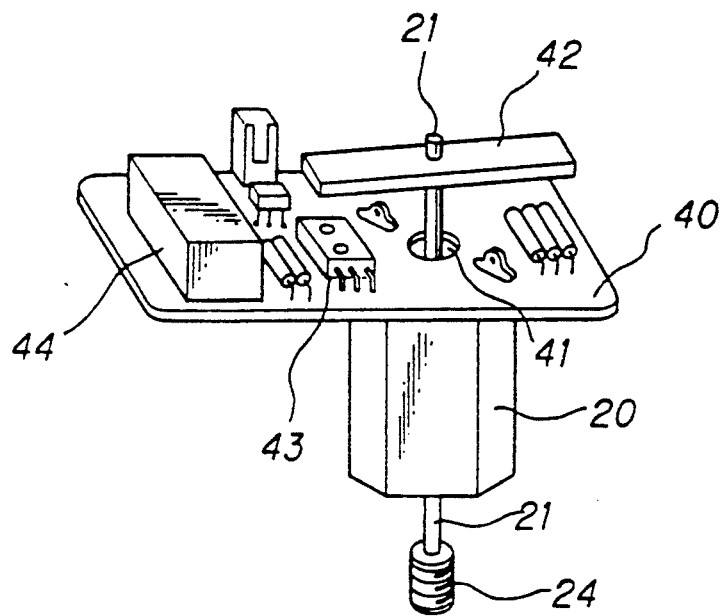
FIG. 2 is a perspective view of a mechanism of the mirror of FIG. 1 in which a reflecting type photoreflector is used as a noncontacting, stop position detecting sensor of the control system for the electrically foldable rearview mirror according to the present invention.
Figure 3:
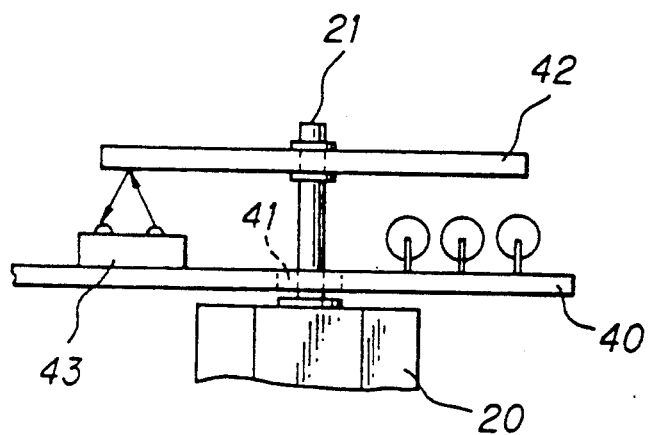
FIG. 3 is a detailed side view of the noncontacting, stop position detecting sensor of FIG. 2.

The frame 17 comprises the base portion 18 having a hole to receive the shaft 13 and a wing portion 19 substantially vertically stood from an end of the base portion 18. The wing portion 19 is secured to the inner wall of the mirror body 15 by several vis 29 and the actuator unit for adjusting the reflecting angle of the mirror is intermediary disposed at the front surface of the mirror body to which a mirror element 16 is attached. To achieve a smooth rotation sliding with centering around the shaft, the bottom surface of the base portion 18 of the frame contacts the upper surface of the extension 12. With the shaft 13 penetrating through the hole of the frame base portion, the clutch gear 30, a ball guide 25, a washer 26, and a spring retainer 27 are inserted in that order and engaged and further a coil spring 28 is located between the washer 26 and the spring retainer 27. The convex portion 48 regulates the rotation of the mirror body and is provided at the root portion of the shaft and concave portion 49 provided on the frame base portion. As enlarged by FIG. 2 and FIG. 3, in the printed circuit board 40 for a motor control circuit, a hole 41 is provided substantially at the center of the printed circuit board 40 to receive the drive shaft 21 protruding from the motor 20 on the end opposite to the end to which the worm 24 is attached. A reflecting rotation board 42 is secured at the end of the drive shaft remote from the end to which the worm 24 is attached. On the surface of the printed circuit board 40, a reflected light photodetector and light source 43, a relay circuit 44 and other electrical components assembly are arranged.

Figure 4:
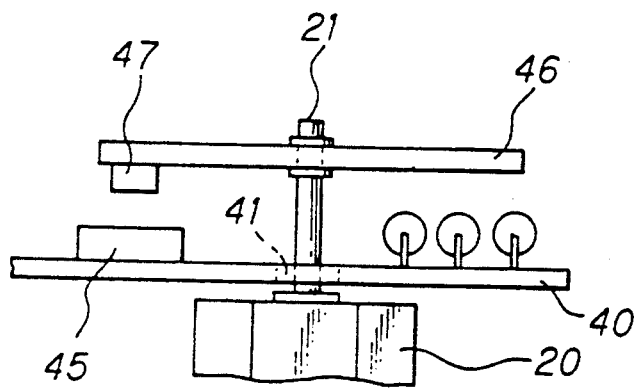
FIG. 4 is a detailed side view of another embodiment in which a magnet and a magnetic sensitive element is used as the sensor.

FIG. 4 shows a modified embodiment of a control circuit means for the electric powered foldable rearview mirror in which in place of the reflected light photodetector and light source, a magnetic sensitive element 45 is provided and corresponding thereto, a magnet 47 is attached at the end surface of the disk 46.

Figure 5:
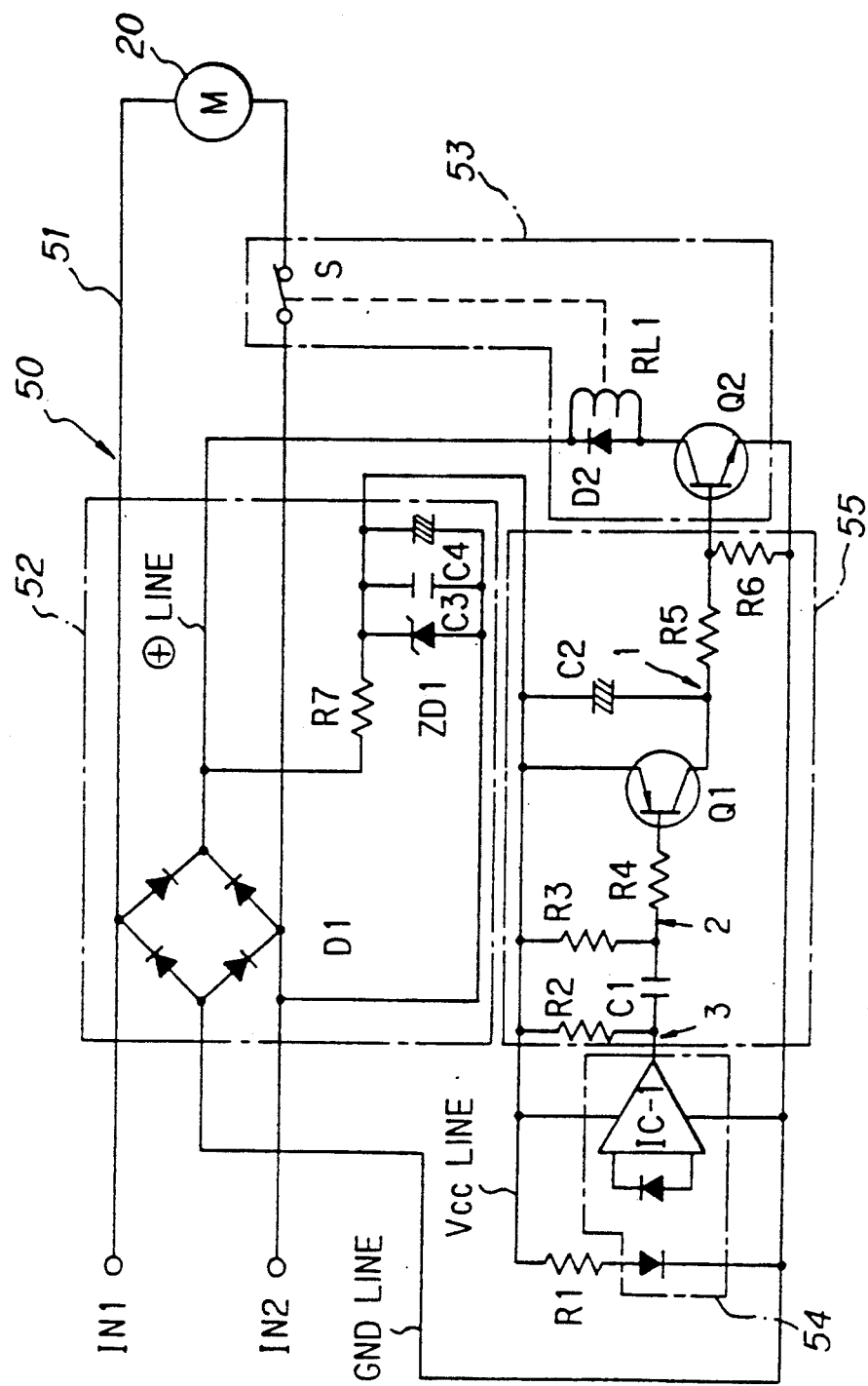
FIG. 5 is a schematic diagram of the control circuit means according to the present invention.

FIG. 5 is a circuit diagram of one embodiment of the control circuit means 50 comprises a motor drive circuit 51 for a motor, a power circuit 52, a switching circuit 53, a sensor circuit 54 and a control input circuit 55. The power circuit 52 comprises a bridge rectifier D1, a resistor R7, Zener-Diode ZD1, and a stabilized power source composed of capacitors C3, C4. The switching circuit 53 comprises a switching transistor Q2 and a relay RL1. When the switching transistor Q2 is put to ON, the relay RL1 is actuated so as to actuate the motor drive circuit 51 by closing relay contact S. In the sensor circuit 54, an output of the reflected light photodetector or of the magnetic sensitive element is amplified by an operation amplifier so that as shown at a point ③ in FIG. 6, a pulse output synchronized to the rotation of the motor 20 is input to a sensor pulse processing circuit 55.

The sensor pulse processing circuit 55 includes a second differentiation circuit comprising a second capacitor C1 and a second resistor R3 connected to a base of a second switching transistor Q1 via a third resistor R4 and also to a collector of the second switching transistor Q1. A first differentiation circuit comprising a first capacitor C2 and a first resistor R5 is connected to the base of the first switching transistor Q2 via the first resistor R5 and also to the second differentiation circuit and a collector of the second switching transistor Q1. The pulses input to the second differentiation circuit are input to the second switching transistor base via the third resistor R4. The emitter of the second switching transistor Q1 sends the intermediate processed signal to the base of the first switching transistor Q2 via the first resistor R5.

The operation of the control circuit means for the electrically powered foldable rearview mirrors according to the present invention will be described hereinafter with reference to the circuit diagram of FIG. 5 and the timing chart of FIG. 6 as following (1) to (10).

(1) The positive electricity is input to the power terminal IN1 and the negative electricity is input to the terminal IN2, the positive electric potential is supplied to a resistor R7 from the power terminal IN1 through the bridge rectifier circuit D1.

(2) Collector supply voltage (Vcc) (5 V potential) is supplied by the stabilized power source comprising the resistor R7, Zener-Diode ZD1, the capacitor C3 and the capacitor C4.

(3) The voltage Vcc rises and the switching transistor Q2 is turned ON during the certain time controlled by the differentiation circuit comprising the capacitor C2 and the resistor R5.

(4) The switching transistor Q2 is turned ON, the relay RL1 is actuated to put a relay contact S ON and the motor control circuit 51 is actuated to rotate the motor.

(5) The reflecting rotation board 42 attached to the motor axis 21 also starts to rotate and rotates over the reflected light photodetector and light source 32 when the motor 20 starts to rotate and the sensor circuit 54 outputs the pulse synchronized to the rotation of the motor (point ③).

(6) The pulse is input to the control input circuit 55, the rise of the pulse is detected by the differentiation circuit composed of the resistor R3 and the capacitor C1 and the transistor Q1 is put to ON during only for a time interval determined by the resistor R3 and the capacitor C1 (put to ON at the transition of the point ②).

(7) The transistor Q1 is turned ON, the electric charge stored in the capacitor C2 of the differentiation circuit comprising the capacitor C2 and the resistor R5 is discharged rapidly (point ①).

(8) The transistor Q1 is turned OFF, the certain time is reset by the differeciation circuit composed of the capacitor C2 and the resistor R5 again and the ON state of the switching transistor Q2 continues.

(9) The mirror body rotates and reaches to the rotation limit position of the erected state or the folded state, the motor is stopped (the state of being locked) and the rotation of the reflecting rotation board 42 is also stopped, thereby the pulse output from the sensor circuit 54 is stopped to leave the transistor Q1 OFF.

(10) Since the discharging of the capacitor C2 does not occur, the switching transistor Q2 is switched OFF and thereafter the relay RL1 is put to OFF.

According to the actuation of the control system described above, the relay contact S is also switched OFF and the motor control circuit 51 is stopped to cut the electricity to the motor.

As described above, the mirror body is accurately stopped at the rotation limit position. Further the sensor circuit 54 is provided on the printed circuit board 40 to enable a simple wiring and a simple circuit composition.

According to the control system for the electrically powered foldable rearview mirror of the present invention, it is possible to provide a simple circuit composition and to decrease the number of components. The sensor circuit simplifies assembly of the printed circuit board, it is possible to decrease the wiring steps and it is possible to increase the accuracy of the mirror body stopping positions.

While the invention has been illustrated and embodied in electrically powered foldable rearview mirrors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An electrical control system for an electrically powered foldable rearview mirror having a mirror body movable between a folded state and an erected state, said electrical control system comprising:

a reversible motor contained in a mirror body movable between a folded state and an erected state;

motor drive circuit means connected to the reversible motor to drive the motor body between the folded state and the erected state;

mechanical stop means to stop rotation of said mirror body when said mirror body reaches the erected state and also when said mirror body reaches the folded state;

noncontacting sensor means for detecting a halt to motor rotation as a result of a halt of mirror body rotation;

control circuit means for interruption of said motor drive circuit means when said noncontacting sensor means detects the halt of motor rotation, said control circuit means including power circuit means;

switching means for switching the motor drive circuit means on and off, said switching means including a switching transistor having a base;

sensor circuit means connected to said noncontacting sensor means to generate a plurality of pulses according to a rotation frequency of said motor; and sensor pulse processing means including a differentiation circuit having a capacitor and resistor, and wherein said differentiation circuit is connected electrically to the sensor circuit mean, the capacitor of the differentiation circuit is charged and discharged by said pulses and is connected to the base of the switching transistor to turn said switching transistor off and on.

2. An electrical control system for an electrically powered foldable rearview mirror as defined in claim 1, further comprising a supporting base and a supporting shaft having a root portion connected to the supporting base, said mirror body being rotatably mounted on said supporting shaft so as to be movable between the erected state and the folded state, and wherein said mechanical stop means is provided in the vicinity of said root portion of said supporting shaft, and said mechanical stop means comprises convex and concave portions positioned on said root portion and said mirror body respectively and structure to stop said mirror body in the erected state and the folded state and said motor is structured so as to be unable to generate sufficient torque to overcome said mechanical stop means.

3. An electrical control system for an electrically powered foldable rearview mirror as defined in claim 1, wherein said motor has a motor drive shaft and said noncontacting sensor means comprises a reflected light photodetector and light source mounted on a printed circuit board not rotating with the motor drive shaft and a reflecting plate attached nonrotatably to the motor drive shaft and structured and positioned so as to reflect light from the light source to the reflected light photodetector when said reflecting plate rotates with said motor drive shaft.

4. An electrical control system for an electrically powered foldable rearview mirror as defined in claim 1, wherein the motor has a motor drive shaft and said noncontacting sensor means comprises a magnet attached nonrotatably to the motor drive shaft and a magnetic sensitive element not rotating with the motor drive shaft and structured and positioned so as to produce a signal indicative of motor drive shaft rotation frequency.

5. An electrical control system as defined in claim 1, wherein said sensor pulse processing means also includes a second differentiation circuit comprising a second capacitor and a second resistor and a second switching transistor having a base and a collector, said second differentiation circuit being directly connected to said sensor circuit means to receive said pulses from said sensor circuit means and also to the base of said second switching transistor, and said collector of said second switching transistor being connected to said first capacitor of said first differention circuit to control a charge state of said first capacitor and said first switching transistor.

6. An electrical control system as defined in claim 1, further comprising a supporting base and a supporting shaft having a root portion connected to the supporting base, said mirror body being rotatably mounted on said supporting shaft so as to be movable between the erected state and the folded state.

* * * * *